United States Patent [19]

Fremont et al.

[11] Patent Number: 4,740,308

[45] Date of Patent: Apr. 26, 1988

[54] MEMBRANE CLEANING PROCESS

[75] Inventors: Henry A. Fremont, Wyoming; Richard C. Agar, Cincinnati; James W. Bray, West Chester; Gregory W. Marquart, Oxford, all of Ohio

[73] Assignee: Champion International Corporation, Stamford, Conn.

[21] Appl. No.: 602,741

[22] Filed: Apr. 26, 1984

[51] Int. Cl.⁴ .............................................. B01D 13/00
[52] U.S. Cl. ..................................... 210/632; 210/636; 210/409
[58] Field of Search ............ 210/409, 632, 636, 321.1, 210/433.2

[56] References Cited

FOREIGN PATENT DOCUMENTS

| 0071386 | 6/1977 | Japan | 210/636 |
| 0106387 | 9/1978 | Japan | 210/636 |
| 0129107 | 10/1980 | Japan | 210/636 |

Primary Examiner—Frank Spear
Attorney, Agent, or Firm—Evelyn M. Sommer

[57] ABSTRACT

A process for cleaning fouled separation membranes such as ultrafiltration, reverse osmosis, and microfiltration membranes is provided comprising: removing a separation membrane having a fouled surface from operation; effecting reaction on the fouled surface of said membrane of an inorganic peroxide and an alkali metal or alkaline earth metal hypohalite; and thereafter, substantially removing the foulant and the reaction products thereof from the membrane surface.

15 Claims, No Drawings

MEMBRANE CLEANING PROCESS

This invention relates to a cleaning process for separation membranes such as ultrafiltration, reverse osmosis, and microfiltration membranes of commercial grades and types made from polymers and typically having an asymmetric structure which rejects solutes at the surface. Examples are modified cullulose acetate films and polysulfone. However, any separation membrane, regardless of chemical composition can be successfully cleaned in accordance with the present invention since the membrane, per se, is not involved in the chemical reaction occurring on the surface thereof. Thus, any conventional reverse osmosis and microfiltration membranes can also be successfully cleaned by the process of the present invention. More particularly, this invention relates to an oxidative and physically vigorous cleaning process for removing foulants from the surface of such membranes.

Many chemical manufacturing processes, especially pulp and paper manufacturing processes, are water intensive and utilize large volumes of water, including raw, untreated water drawn from the immediate vicinity of the chemical plant. Such raw water contains many biologically active potential foulants as well as dissolved and suspended chemical foulants. As a result, it has become necessary to treat such raw water streams before introduction into the plant processing systems. Additionally, with more stringent anti-pollution standards and the increasing cost of water, it has also become necessary to treat most waste water or effluent streams leaving such chemical plants in order to control the biological oxygen demand (BOD), color, temperature, and pH thereof prior to discharge from the plant into a watercourse, lake, stream, pond or the like.

One technique that has proven quite useful and versatile in the removal of a large variety of pollutants and foulants from water influents and effluents is, for example, the ultrafiltration process disclosed in U.S. Pat. No. 3,758,405. However, the use of ultrafiltration membranes as disclosed in said patent necessitates frequent and rather difficult cleaning operations because of fouling and membrane failure caused by scale, slime or other foulant layer build up on the surface of the ultrafiltration membrane. Typically, such membranes require almost daily cleaning with extreme care as to the cleaning agents, temperature and pH conditions employed in order to prevent chemical attack or degradation of the membrane itself.

Ultrafiltration is a membrane process for the concentration of dissolved materials in aqueous solutions. A semipermeable membrane is used as the separating agent and pressure as the driving force. In an ultrafiltration process, a feed solution is introduced into a membrane unit or cell where water and certain solutes pass through the membrane having a predetermined pore size under an applied hydrostatic pressure. Solutes, whose sizes are greater than the pore size of the membrane, are retained and concentrated. The pore structure of the membrane thus acts as a molecular filter, passing some of the smaller size solutes and retaining the larger size solutes. The pore structure of this molecular filter is such that it does not become plugged because the solutes are rejected at the surface and do not penetrate the membrane. Furthermore, there is no continuous build-up of a filter cake which has to be removed periodically to restore flux (rate of solution transport through the membrane) since concentrated solutes are removed in solution. However, slimes, scales and other foulants such as humic acid, a forest floor decomposition product, often times found in raw water, can build up on the membrane surface increasing the system pressure and reducing the flux thereby necessitating frequent cleaning thereof.

In commercial operation, the number of ultrafiltration cells to be used is determined by the total volume of the stream to be treated, the membrane area, and the separation efficiency which is affected by composition and pH of the stream, temperature and pressure of operation, and feed flow rate through the membrane (flux). Once these operating parameters are known, the number of ultrafiltration cells required can be easily calculated in conventional manner. In addition, in order to avoid process disruption from membrane fouling and high operating pressures, the cells can be arranged in stages separated by pumps so that the stream can be passed sequentially through each stage. In this manner, a stage or stages can be removed from the system to enable membrane cleaning without closing down the entire ultrafiltration system.

Conventional chemical cleaning methods heretofore employed have been found to be relatively ineffectual in the removal of foulants from separation membranes. Thus, sodium hydroxide, ethylene diamine tetraacetic acid (EDTA), enzyme detergents and weak acids have all proven to be of limited applicability. Strong acid solutions, while effective cleaning agents, discolor and chemically attack the membrane and therefore do not provide a viable cleaning technique. Hydrogen peroxide, employed in an attempt to oxidize and clean the membrane, was found not to be generally effective. Household bleach (NaOCl) similarly was found not to be generally effective.

Accordingly, it is an object of the present invention to provide a separation membrane cleaning process which effectively and efficiently removes foulant layers from the surface of such membranes.

It is another object of the present invention to provide a low cost separation membrane cleaning system which provides a synergistic cleaning effect without chemically attacking the membrane surface.

These as well as other objects and advantages are provided by the process for cleaning fouled separation membranes in accordance with the present invention which comprises:

removing a separation membrane having a fouled surface from operation;

effecting reaction on the fouled surface of said membrane between an inorganic peroxide and an alkali metal or alkaline earth metal hypohalite; and thereafter, substantially removing the foulant and the reaction products thereof from the membrane surface.

Quite surprisingly, it has now been found that when an inorganic peroxide such as hydrogen peroxide, sodium peroxide, calcium peroxide, and the like, is caused to react on the surface of a separation membrane with an alkali metal or alkaline earth metal hypohalite of the formula MOX wherein M is an alkali metal or alkaline earth metal such as sodium, potassium, calcium, magnesium, and the like and X is a halide such as a fluoride, chloride, iodide, or bromide, illustrative of which are sodium hypochlorite, potassium hypochlorite, calcium hypochlorite, magnesium hypochlorite and the like, in the presence or absence of additional cleaning agents, a synergistic cleaning effect is obtained providing both chemical cleaning and physical scouring due to the high energy oxygen evolved as a result of the reaction. Moreover, it has been found that the cleaning process of the present invention does not chemically attack and/or degrade the surface of the separation membrane or the adhesives commonly used for sealing membrane modules.

Ultrafiltration membranes of the type disclosed in U.S. Pat. No. 3,758,405, pertinent portions of which are incorporated herein by reference, can be sucessfully cleaned in accordance in the present invention. Although the membranes disclosed therein are generally modified cellulose acetate films, it is currently believed that any separation membrane, regardless of chemical composition, can be successfully cleaned in accordance with the present invention since the membrane, per se, is not involved in the chemical reaction occurring on the surface thereof. Thus, any conventional reverse osmosis and microfiltration membranes can also be successfully cleaned by the process of the present invention. Similarly, although U.S. Pat. No. 3,758,405 discloses the use of ultrafiltration membranes for color removal from Kraft mill aqueous effluents, the cleaning process of the present invention is equally applicable to the cleaning of fouled separation membranes whether fouled from use in conjunction with influent or effluent streams. In fact, the cleaning process of the present invention is especially useful for cleaning ultrafiltration membranes used to pre-treat raw feed water for boilers. Such raw feed water streams contain a significant amount of humic acid and other foulants which usually give rise to the formation of a reddish-brown fouling layer on such membranes.

In commercial operation, the separation zone comprises a number of separation cells arranged in stages separated by pumps so that the stream to be treated can be passed sequentially as well as in parallel through each stage. If a separation cell becomes fouled, it can be by-passed and taken out of service without causing shut down of the overall separation process.

Upon isolation of the fouled separation membrane, it can be immersed in or sprayed with aqueous solutions of either or both of the reactants employed in the process of the present invention with or without the conjoint use of other conventional cleaning agents. Thus, for example, the isolated membrane can be immersed in an aqueous solution containing from about 0.10 to 30 percent by weight inorganic peroxide. After treatment with the aqueous peroxide solution for a period of at least about 3 seconds, the membrane can be rinsed with an aqueous solution containing from about 0.10 to 10 percent by weight of an alkali metal or alkaline earth metal hypohalite whereupon a rapid chemical reaction takes place at the surface of the membrane as evidenced by vigorous bubbling at said surface due to the in situ generation of oxygen as follows:

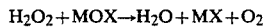

$$H_2O_2 + MOX \rightarrow H_2O + MX + O_2$$

During the reaction, the foulant layer is lifted off the surface of the membrane and rinsed away. Thereafter, the membrane can be rinsed with water to remove any vestiges of the foulant and then the membrane can be returned to service. Employing the cleaning process of the present invention does not result in any chemical attack or discoloration of the membrane itself.

In the above chemical equation, the reaction of the hypohalite and hydrogen peroxide is instantaneous and hence the hypohalite ion is reduced to the halide ion before it can react with the membrane structure. The reaction produces a high energy form of oxygen termed "singlet oxygen" which is a very specific and extremely highly oxidizing form of oxygen. The optimum pH for the reaction to produce singlet oxygen is between 8.5 and 11.

If desired, the cleaning reaction can be conducted in combination with the use of other conventional cleaning agents such as alkali metal hydroxides, e.g. NaOH, KOH and the like, alkaline earth metal hydroxides, e.g. $Ca(OH)_2$, $Mg(OH)_2$ and the like; EDTA, mineral acids such as HCl, enzyme cleaning solutions and the like.

It is apparent, of course, that the cleaning process of the present invention can be effected by first contacting the fouled membrane with either the peroxide or the hypohalite and thereafter contacting the membrane with the other reactant to effect reaction at the surface thereof. Contact with the membrane by the reactants can be achieved in any convenient fashion such as immersion, spraying, solution recirculation, and the like.

Preferably, the isolated membrane is immersed in an aqueous solution containing from about 1–5% by weight $H_2O_2$ or hypohalite for a period of from about 10 seconds to about 20 minutes and then rinsed with an aqueous solution of the other reactant, i.e., hypohalite or $H_2O_2$ of substantially the same strength. Once the evolution of gaseous oxygen has ceased and the foulant layer has been effectively removed, the membrane can be washed in water and promptly returned to service. The aqueous reactant solutions are generally employed at temperatures ranging from about 20° C. to about 80° C.

The following examples further illustrate the present invention. These examples are presented for illustrative purposes only and are not to be construed in limitation of either the spirit or scope of the present invention. Unless otherwise stated, all percentages and parts are by weight.

COMPARATIVE EXAMPLES 1–9

To illustrate the relative ineffectiveness of conventional cleaning agents on ultrafiltration membranes, a polysulfone membrane module fouled with a reddish brown fouling layer believed to have been generated by an accumulation of humic acid and other foulants was removed from an ultrafiltration cell of the type described in U.S. Pat. No. 3,758,405 which, prior to removal from service, had been employed to pre-treat raw boiler feed water. Attempts were made to remove the foulant layer by immersion of samples of the fouled membrane in the cleaning solution for a period of time. Thereafter, the "cleaned" membrane sample was washed with water to remove any residual cleaning agent and the membrane was returned to service. The average filtration rate in the fouled condition was determined from 19 samples of the fouled membrane to be 53.8 GFD±4.5. The average filtration rate in the "cleaned" condition was also determined. Table 1 hereinbelow summarizes the results obtained.

As can be seen from Table I, the conventional cleaning agents were ineffectual. In those few instances where some improvement was obtained, the improvement was relatively insignificant. Although a significant improvement was obtained when a 38% HCl aqueous solution was employed, the acid discolored and chemically attacked the membrane. Accordingly, such highly concentrated acid solution cannot be considered a generally useful cleaning agent for ultrafiltration membranes.

EXAMPLE 1

The procedure employed in Comparative Examples 1–9 was repeated except that the membrane was immersed in a 30% $H_2O_2$ aqueous solution maintained at 80° C. for 25 minutes. Thereafter, the membrane was removed from the $H_2O_2$ solution and rinsed with a 5.25% NaOCl aqueous solution maintained at 20° C. for about one minute.

A rapid chemical reaction took place as evidenced by a vigorous bubbling at the surface of the membrane. The reddish brown fouling layer was lifted off the surface of the membrane and rinsed away. Thereafter, the membrane was washed with water and returned to service. The average flux (GFD) exhibited by the fouled membrane was 53.8; whereas, the flux exhibited by the cleaned membrane averaged 495 for twenty minutes. No discoloration or chemical attack of the membrane was observed.

TABLE I

| Comparative Example No. | Cleaning Regimen | Average Filtration Rate (Cleaned Condition)[1] Gallons/ft.$^2$/day (GFD) |
|---|---|---|
| 1 | 0.5% NaOH aqueous solution 0.25% EDTA | 58.2 |
| 2 | 0.7% enzyme-containing detergent #972-55-1 obtained from H. B. Fuller Company, Monarch Chemicals Division, Minneapolis, Minnesota | 56.8 |
| 3 | 4 ml. Monarch Membrane Acid 23 available from H. B. Fuller Company, Monarch Chemicals Division per liter of water followed by 0.7% enzyme-containing detergent of Comp. Ex. 2 | 39.2 |
| 4 | Tap Water | 53.2 |
| 5 | 5% HCl aqueous solution | 52.5 |
| 6 | 10% HCl aqueous solution | 52.2 |
| 7 | 20% HCl aqueous solution | 74.4 |
| 8 | 22.1% HCl aqueous solution 4.1% $H_2O_2$ aqueous solution | 79.9 |
| 9 | 38% HCl aqueous solution | 310.5 |

[1]Average filtration rate of all samples in the fouled condition = 53.8 ± 4.5 GFD

EXAMPLE 2

As shown in Comparative Example 7, when the fouled membrane was "cleaned" with a 20% HCl aqueous solution, the flux averaged 74.4 GFD. When, however, Comparative Example 7 was repeated except that the fouled membrane was immersed in an aqueous solution containing 20% HCl and 7.5% $H_2O_2$ and then rinsed with a 5.25% NaOCl aqueous solution, the flux was 323.6 GFD.

EXAMPLE 3 AND COMPARATIVE EXAMPLE 10

To demonstrate the synergistic effect obtained in accordance with the membrane cleaning process of the present invention, Comparative Example 1 was repeated twice, first using an aqueous solution containing 0.5% NaOH+0.25% EDTA as the immersion medium and rinsing with a 5.25% NaOCl aqueous solution (Comparative Example 10) and comparing this to the use of an immersion medium comprising an aqueous solution containing 0.5% NaOH+0.25% EDTA+7.5% $H_2O_2$ and rinsing with a 5.25% NaOCl aqueous solution (Example 3). The results are summarized in Table II.

TABLE II

| Comparative Example No. | Cleaning Regimen | Average Filtration Rate (Cleaned Condition)[1] Gallons/ft.$^2$/day (GFD) |
|---|---|---|
| Comparative Ex. 1 | 0.5% NaOH aqueous solution 0.25% EDTA | 58.2 |
| Comparative Ex. 10 | 0.5% NaOH aqueous solution 0.25% EDTA rinse with 5.25% NaOCl aqueous solution | 70.2 |
| Example 3 | 0.5% NaOH aqueous solution 0.25% EDTA 7.5% $H_2O_2$ aqueous solution rinse with 5.25% NaOCl aqueous solution | 314.1 |

[1]Average filtration rate of all samples in fouled condition = 53.8 ± 4.5 GFD what is claimed is:

1. Process for cleaning fouled separation membranes comprising:
    removing a separation membrane having a fouled surface from operation;
    generating singlet oxygen in situ by effecting reaction on the fouled surface of said membrane of an inorganic peroxide and an alkali metal or alkaline earth metal hypohalite of the formula MOX wherein M is an alkali metal or alkaline earth metal and X is a halide; and thereafter,
    substantially removing the foulant and the reaction products thereof from the membrane surface.

2. Process as defined in claim 1 wherein the inorganic peroxide is hydrogen peroxide.

3. Process as defined in claim 1 wherein the alkali metal or alkaline earth metal hypohalite is an alkali metal or alkaline earth metal hypochlorite.

4. Process as defined in claim 1 wherein the inorganic peroxide comprises an aqueous solution containing from about 0.10 to 30 percent by weight inorganic peroxide.

5. Process as defined in claim 4 wherein said membrane is immersed in said aqueous solution for a period of at least about 3 seconds.

6. Process as defined in claim 5 wherein said solution is maintained at a temperature of from about 20° to 80° C.

7. Process as defined in claim 1 wherein the alkali metal or alkaline earth metal hypohalite comprises an aqueous solution containing from about 0.10 to 10 percent by weight of said hypohalite.

8. Process as defined in claim 5 wherein, upon completion of immersion in said aqueous solution of inorganic peroxide, the resulting membrane is rinsed with an aqueous solution containing from about 0.10 to 10 percent by weight of an alkali metal or alkaline earth metal hypohalite.

9. Process as defined in claim 8 wherein said aqueous hypohalite solution is maintained at a temperature of from about 20° to 80° C.

10. Process as defined in claim 1 wherein reaction is effected at a pH between about 8.5 and 11.

11. Process as defined in claim 4 wherein said aqueous solution additionally contains a cleaning agent selected from the group consisting of an alkali metal hydroxide, an alkaline earth metal hydroxide, ethylene diamine tetraacetic acid, mineral acids, enzyme cleaning solutions and mixtures thereof.

12. Process as defined in claim 1 wherein after effecting reaction, the membrane is washed with water.

13. Process as defined in claim 1 wherein the separation membrane is an ultrafiltration membrane.

14. Process as defined in claim 1 wherein the separation membrane is a reverse osmosis membrane.

15. Process as defined in claim 1 wherein the separation membrane is a microfiltration membrane.

* * * * *